Patented Oct. 30, 1945

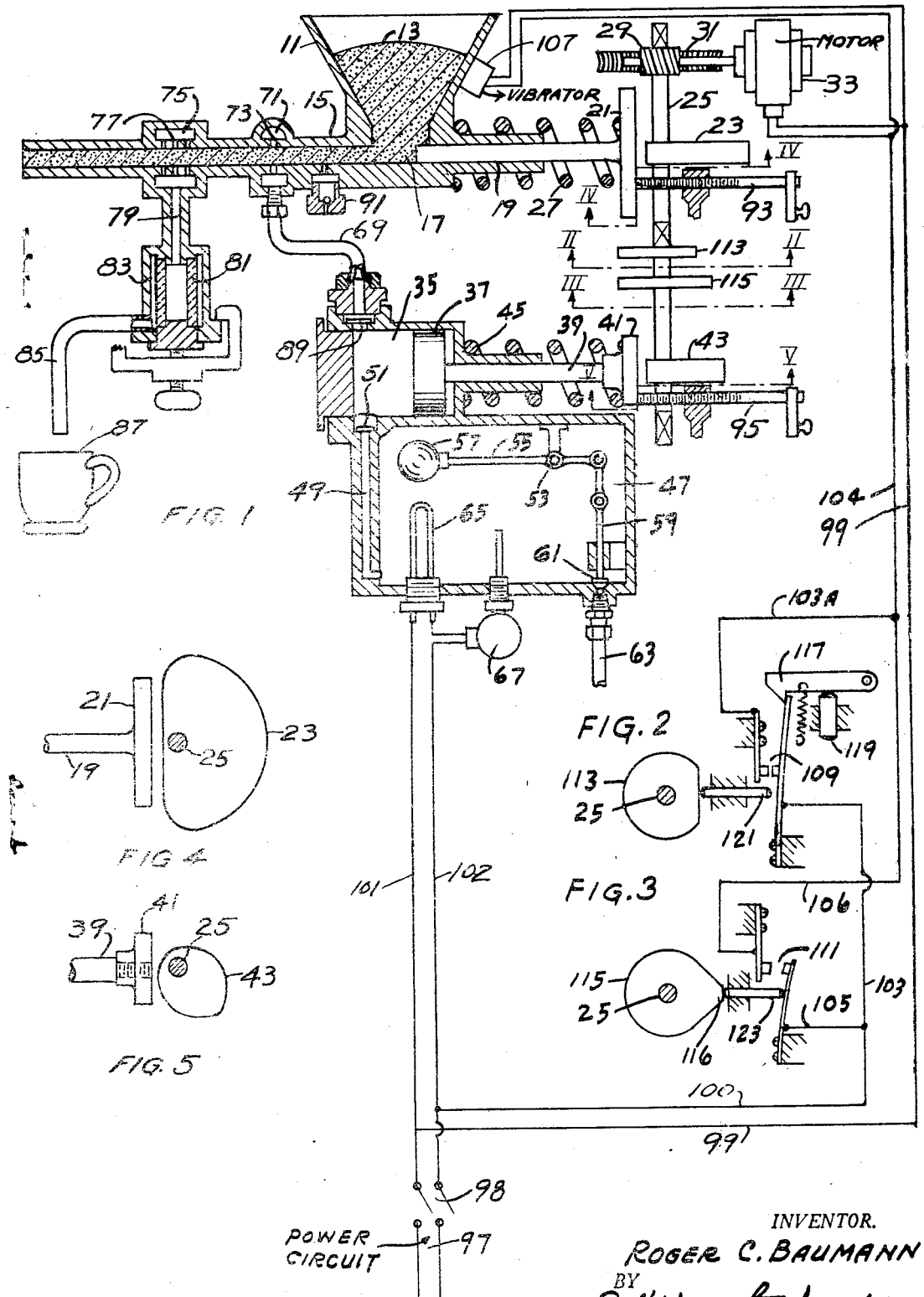

2,387,871

UNITED STATES PATENT OFFICE 2,387,871

AUTOMATIC COFFEE BREWER OR MAKER

Roger C. Baumann, West Memphis, Ark.

Application September 13, 1943, Serial No. 502,117

6 Claims. (Cl. 99—289)

This invention relates to a device for steeping granular material, as in the brewing of coffee.

It particularly relates to a device of this kind in which coffee for a single cup is measured and a measured quantity of water heated to a desired temperature is brought in contact with this measured amount of coffee to make the single cup of coffee, and this operation is repeated for each cup made.

At the present time coffee is made largely in quantity and is kept hot until used, the result usually being that the freshly made coffee is often weak and the last used coffee has become flat and much less palatable than it should be.

The objects of the invention are:

To provide means and methods for making coffee of uniform strength and at uniform temperature;

To provide means and methods for making coffee in individual units of a single cup;

To provide means for adjusting the strength of the coffee from time to time;

To provide means for mechanically performing the various operations and making the necessary measurements whereby the variations in measurements from cup to cup, due to human frailty, are substantially eliminated.

A further object is to reduce the labor element necessary and minimize waste of materials used.

In accomplishing these objects, means are provided for measuring out the quantity of coffee needed to make a single cup of desired strength, and for automatically repeating this measuring operation for each succeeding cup, and provision is made for adjusting the quantity measured, to increase or decrease the strength as desired. Provision is also made for concurrently measuring out the necessary amount of water for each cup and for maintaining the water at the desired temperature; and provision is also made for coordinating the measuring of the coffee and the feeding in of the water.

The means by which these and other objects of the invention are carried out, will readily be understood from the following specification upon reference to the accompanying drawing, in which:

Fig. 1 is a diagrammatic view of the device showing all the parts in one plane for simplicity of description, though not necessarily in the actual positions which they may occupy.

Figs. 2 and 3 are diagrammatic sections, taken as on the line II—II and III—III respectively, of Fig. 1, showing the switching mechanism operated by certain of the cams for making and breaking an electric circuit actuating the various mechanisms employed.

Figs. 4 and 5 are sections, taken on the line IV—IV and V—V of Fig. 1, showing the preferred contour of the cams which respectively operate the coffee and water measuring apparatus.

Referring now to the drawing in which the various parts are indicated by numerals:

11 is a hopper in which the coffee 13, ground to desired fineness, is placed. This hopper feeds by gravity into a measuring apparatus therebelow, this apparatus comprising an elongated coffee barrel 15 disposed in substantially horizontal position immediately below the hopper is opened thereinto for reception of coffee from the hopper.

Mounted in the barrel is a plunger 19 which may have a disc-like head 21, with which a cam 23 cooperates. Cam 23 is mounted on and secured to a shaft 25 suitably journalled in supports, not shown. Return movement of the plunger 19 is effected by a spring 27. Shaft 25 is driven a through a worm 29 and gear 31, or other desired form of reduction gearing, by a motor 33.

35 is the cylinder of a water pump in which is mounted a reciprocable plunger 37 which is reciprocated through a piston rod 39 and disc 41 by a second cam 43, also secured on and turned by the shaft 25. Plunger is returned to initial position by a spring 45. 47 is a water reservoir which is connected by a passageway 49 with the cylinder 35, this passageway at its entrance into the cylinder being provided with a check valve 51, here indicated as of disc type.

Mounted within the reservoir 47, as on a pivot support 53, is an arm 55 which carries at one end a float 57 responsive to water level in the reservoir. Oppositely the arm 55 is connected through suitable linkage 59 with a cut-off valve 61. 63 is a water supply pipe on suitable source, not shown, through which water is supplied to the reservoir 47, cut-off of supply being effected by the valve 61.

65 is an electrically energized heating element for heating water in reservoir 47, and 67 a thermostatic switch controlling electric flow to the heating element 65.

The pump 35 is connected by a tubular passageway 69 to an annular chamber 71 around the barrel 15, this chamber discharging through suitable ports 73 into the bore 17 of the barrel. Also surrounding the barrel and spaced from the chamber 71 is a second annular chamber 75 into which water in the bore 17 may escape through ports 77. From the chamber 75 a passageway 79 leads downward into an annular filter 81, through which the water radially escapes into an enclosing chamber 83, from which a discharge pipe 85 leads and discharges as into a cup 87. Return flow through tubular passageway 69 into the piston 35 is prevented by check valve 89. 91 is a relief valve through which air feeds into the bore 17 of the pump barrel to facilitate return movement of the plunger 19.

93 is an adjustable stop which limits return movement of plunger 19, under action of spring 27, and thereby regulates the length of stroke and the quantity of the coffee delivered. 95 is a similar adjustable stop through which return stroke of the pump plunger 37 is limited.

The motor 33 is energized by electric current from a suitable power circuit 97 through suitable leads 99 and 100; and the heating element 65 through leads 101 and 102, current flow to the heater 65 being controlled by the thermostatic switch 67, before mentioned.

Lead 99 extends directly to motor 33 and lead 100 through lead 103 to a switch 109 and from switch 109 through leads 103A, 104 to the motor. Lead 100 also extends in parallel through lead 105 to a second switch 111, and from this switch through leads 106 and 104 to the motor. Switches 109 and 111 are respectively opened by cams 113 and 115, both of which are secured on the shaft 25 and turn therewith. Leads 99 and 104 may also be extended to energize a vibrator 107 which facilitates discharge from hopper 11.

Cam 113 has a flattened sector which permits closing of switch 109 during a limited period of rotation, and cam 115 a raised portion 116, which accomplishes opening of switch 111 during a substantially concurrent, but more limited period.

Switch 109, when opened, is held open by a latch 117 which is released to initiate action by a manually operable button 119, and when so released, establishes a circuit through its contacts to the motor 33 and vibrator 107. 121 is a plunger which cooperates with cam 113 to engage arm of switch 109, to open the switch, and engage the switch arm with latch 117. 123 is a plunger which is engaged by cam portion 116 to open switch 111.

In using the machine, coffee is placed in the hopper 11 and water turned on through pipe 63. Switch 98 is closed, energizing leads 99 and 100 and through leads 101, 102, the heater 65 through the water in the reservoir is heated, such heating continuing until the thermostatically controlled valve 67 effects cut-off and thereafter being resumed and cut-off automatically as temperature falls or rises.

Should the switch 109 or the switch 111 be closed when switch 98 was closed, current would also flow through leads 99 and 100 to the motor energizing the motor, and through reduction gears 29, 31, turn the shaft 25 producing partial or complete strokes of the coffee plunger 19 and the pump plunger 37. If switch 109 is closed cam 113 almost immediately opens it, but energization continues until raised portion 116 of cam 115 opens switch 111 and breaks the circuit to the motor, leaving the cams 113, 115 in the position shown in Figs. 2 and 3, with the switch 109 held open by latch 117 and switch 111 held open by cam 115 and plunger 123.

To operate, button 119 is pushed to raise latch 117 and allow switch 109 to close, completing circuit through lead 99 and leads 100, 103, 103A and 104 to the motor 33, energizing and starting it, the motor, through reduction gears 29, 31, turning shaft 25 and cams 23, 43, 113 and 115. The raised portion 116 of the cam 115 moves from beneath plunger 123 allowing switch 111 to close and through lead 99 and leads 100, 105, 106 and 104, complete a circuit to the motor by-passing switch 109. Cam 113, through plunger 121, opens switch 109 and engages the arm of the switch with latch 117 to hold it open, but energization of the motor continues through the by-pass circuit until raised portion of the cam 115 opens switch 111 and breaks circuit to the motor, completing a cycle.

During each cycle the motor turns the shaft 25 and the cams 23 and 43 thereon one complete turn. In making this turn the cam 23 shifts the plunger 19 and moves a charge of coffee from beneath the hopper into the barrel 15. As the cam 23 completes shift of the plunger 19, the cam 43 engages the disc 41 and shifts the plunger 37, displacing from the cylinder 35 a charge of water sufficient to make a cup of coffee, this water passing through the ports 73 into the barrel and initially wasting through the then open end thereof. The cycle is repeated until a charge of coffee has been shifted past the ports 73, and the water subsequently entering through these ports lixiviates such charge, and is further repeated until displaced charges block up the barrel beyond the ports 77 and effect a substantial closure against escape of water through the end of the barrel.

After the barrel is filled and end closure accomplished each subsequent action discharges a spent charge from the end of the barrel. With the barrel filled, button 119 is pushed as coffee is desired. Each push of the button energizes the motor, as described above. Plunger 19 shifts a fresh charge of coffee discharged from the hopper 11 and in so doing shifts a previous charge beyond the annular channel 71 around the coffee barrel. Water at proper temperature is delivered by the pump 35—37 to channel 71 and through coffee charge in barrel, and ports 77 to chamber 75, and through filter 81 and spout 87 into cup, this operation being repeated for each cup desired. Should the charge of coffee be greater than is necessary to provide a cup of coffee of desired strength, the screw 93 may be adjusted to shorten the effective stroke and reduce the quantity of coffee delivered, or should the charge be insufficient the stop 93 may be reversely shifted to increase the return stroke of the plunger 19 and thereby increase the effective stroke of the plunger. The stroke and volume of the water pump may also be similarly adjusted by screwing the stop 95 toward or away from the disc 41 of the plunger to shorten or lengthen the stroke, as the case may be.

I claim:

1. A device for steeping a granular material, as coffee, which includes a horizontally disposed elongated barrel open at both ends, a storage hopper above said barrel intermediate its length and opening into said barrel, a plunger reciprocally mounted in one end of said barrel immediately adjacent said hopper opening, a fluid injection chamber around and in communication with said barrel, spaced along said barrel from said hopper opening, oppositely to said plunger, a fluid discharge chamber around and in communication with said barrel spaced along said barrel from said injection chamber, said barrel having substantial extension beyond said latter chamber, resilient means holding said plunger in retracted position to uncover at least a major portion of said hopper opening, means for actuating said plunger, to shift material discharged from said hopper into alinement with said injection chamber and displace preceding charges, and means for delivering measured charges of liquid, as water, through said injection chamber, said barrel and said discharge chamber to discharge.

2. A device for steeping a granular material, as coffee, which includes a horizontally disposed elongated barrel open at both ends, a storage hopper above said barrel intermediate its length and opening into said barrel, a plunger reciprocally mounted in one end of said barrel immediately adjacent said hopper opening, a fluid injection chamber around and in communication with said barrel, spaced along said barrel from said hopper opening oppositely to said plunger, a fluid discharge chamber around and in communication with said barrel additionally spaced along said barrel from said injection chamber, said barrel having substantial extension beyond said latter chamber, resilient means holding said plunger in retracted position to uncover at least a major portion of said hopper opening, means to limit the retraction of said plunger, means for actuating said plunger to shift material discharged from said hopper, into alinement with said injection chamber and displace preceding charges, and means for delivering measured charges of liquid, as water, through said injection chamber, said barrel and said discharge chamber to discharge.

3. A device in accordance with claim 2, in which said plunger limiting means is adjustable.

4. A device for steeping a granular material, as coffee, which includes a horizontally disposed elongated barrel open at both ends, a storage hopper above said barrel intermediate its length and opening into said barrel, a plunger reciprocably mounted in one end of said barrel immediately adjacent said hopper opening, a fluid injection chamber around and in communication with said barrel, spaced along said barrel from said hopper opening oppositely to said plunger, a fluid discharge chamber around and in communication with said barrel spaced along said barrel from said injection chamber, said barrel having substantial extension beyond said latter chamber, a filter chamber below and in communication with said discharge chamber, resilient means holding said plunger in retracted position to uncover at least a major portion of said hopper opening, means for actuating said plunger to shift material discharged from said hopper into alinement with said injection chamber, and displace preceding charges, and means for delivering measured charges of liquid, as water, through said injection chamber, said barrel and said discharge chamber to discharge.

5. A device for steeping a granular material, as coffee, which includes a horizontally disposed elongated barrel open at both ends, a storage hopper above said barrel intermediate its length and opening into said barrel, a plunger reciprocally mounted in one end of said barrel immediately adjacent said hopper opening, a fluid injection chamber around and in communication with said barrel, spaced along said barrel from said hopper opening oppositely to said plunger, a fluid discharge chamber around and in communication with said barrel spaced along said barrel from said injection chamber, said barrel having substantial extension beyond said latter chamber, resilient means holding said plunger in retracted position to uncover at least a major portion of said hopper opening, means for actuating said plunger, to shift material discharged from said hopper into alinement with said injection chamber and displace preceding charges, means for delivering measured charges of liquid, as water, through said injection chamber, said barrel and said discharge chamber to discharge, and means for coordinating actuating movements of said plunger and said liquid measuring and delivering means.

6. A device for steeping a granular material, as coffee, which includes a horizontally disposed elongated barrel open at both ends, a storage hopper above said barrel intermediate its length and opening into said barrel, a plunger reciprocally mounted in one end of said barrel immediately adjacent said hopper opening, a fluid injection chamber around and in communication with said barrel, spaced along said barrel from said hopper opening oppositely to said plunger, a fluid discharge chamber around and in communication with said barrel spaced along said barrel from said injection chamber, said barrel having substantial extension beyond said latter chamber, resilient means holding said plunger in retracted position to uncover at least a major portion of said hopper opening, means for actuating said plunger, to shift material discharged from said hopper into alinement with said injection chamber and displace preceding charges, a liquid supply tank in communication with said injection chamber, means for heating liquid in said tank, and means for delivering measured charges of liquid, as water, from said tank through said injection chamber, said barrel and said discharge chamber to discharge.

ROGER C. BAUMANN.